United States Patent Office 3,271,494
Patented Sept. 6, 1966

3,271,494
PRODUCTION OF SHAPED PRODUCTS FROM SOLUTIONS OF POLYVINYL FORMATE IN A LOWER ALKYL NITRILE
Kiyoshi Fujii, Saburo Imoto, Tadao Ashikaga, and Junji Ukida, Kurashiki, Japan, assignors to Kurashiki Rayon Co., Ltd., Kurashiki-shi, Okayama, Japan, a corporation of Japan
No Drawing. Filed Nov. 29, 1961, Ser. No. 155,809
Claims priority, application Japan, Dec. 3, 1960, 35/47,289
7 Claims. (Cl. 264—184)

This invention relates to the preparation of shaped forms of vinyl formate polymers, including homopolymers and copolymers, and is more particularly concerned with solutions of such polymers from which such shaped forms can be produced and converted to polyvinyl alcohol.

Little study has previously been undertaken in connection with the preparation of shaped products, e.g. fibers, films, and the like, from polyvinyl formate or copolymers of vinyl formate, and similarly few attempts have been made with respect to the formation of solutions of polyvinyl formate or copolymers of vinyl formate from which such shaped products could be formed. This is believed to be due to the fact that formic esters are generally chemically unstable, and have no particular outstanding characteristics. Polyvinyl alcohols, on the other hand, which can be obtained by saponifying polyvinyl formate, and vinyl formate copolymers, have significant utility for industrial and clothing purposes. However, most polyvinyl alcohols are produced from vinyl acetate polymers as the raw material, and conventional methods of forming shaped products of polyvinyl alcohol from water solutions of this polymer are economical and extensively used.

Our studies have shown that polyvinyl alcohol having a highly-regular molecular structure can be very efficiently produced from polyvinyl formate obtained by polymerizing vinyl formate, particularly at low temperatures. However, when it is attempted to spin or mold such polyvinyl alcohols in practice, it is difficult to prepare a stable spinning solution which maintains a satisfactory dissolved condition, since these polyvinyl alcohols are only slightly soluble in water and, as a result, shaped products of superior quality cannot be produced.

It is accordingly an object of the present invention to provide a method for preparing shaped polymer products having desirable properties, which is industrially and economically practical, and which is free from the drawbacks of prior processes in the production of polyvinyl alcohol derived from vinyl formate polymers.

It is another object of the invention to provide solutions of vinyl formate polymers from which shaped polymer products can be readily produced, including shaped forms of polyvinyl alcohol, and from which the solvents can be easily recovered.

In accordance with the invention, there are provided stable solutions of vinyl formate polymers which can be readily spun or otherwise formed into shaped products in conventional apparatus, the solutions being composed of the polymer dissolved in a solvent which is a lower alkyl nitrile such as acetonitrile, propionitrile, and the like. To produce polyvinyl alcohols of desirable characteristics, these polymers are spun or otherwise introduced into a solution of conventional composition effective to convert the vinyl formate polymer into polyvinyl alcohol. Polyvinyl alcohol is a polymer containing hydroxyl groups and corresponding to the formula:

$$(-CH_2-CH)_n$$
$$\phantom{(-CH_2-}|$$
$$\phantom{(-CH_2-CH)}OH$$

wherein $n$ is an integer which can vary within wide limits, as is well-known in the art. Polyvinyl alcohol can be produced from the corresponding polyvinyl ester, e.g. polyvinyl formate, by alkaline or acid saponification or re-esterification, i.e. alcoholysis, in accordance with the following equation:

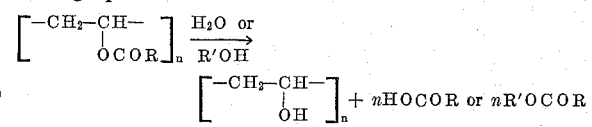

We have discovered that polyvinyl alcohol fibers and films of very good quality can be produced by saponifying the polyvinyl formate or vinyl formate copolymer to convert it into polyvinyl alcohol and then effecting heat treatment and thermal elongation of the formed product.

Ketones, such as acetone, and organic chlorine compounds, such as chloroform, are cited as solvents for polyvinyl formate. However, only a few of them are actually usable, and most of them cannot be considered as effective solvents. Moreover, their solutions are so unstable that they show a significant rise in viscosity, and even form gels, when allowed to stand for any appreciable period. They are not satisfactory, therefore, for use in the formation of stable solutions which are desired in operations involving the preparation of shaped polymer forms. We have made the discovery, however, that lower alkyl nitriles not only are effective solvents for vinyl formate polymers but that they form very stable solutions which are particularly suitable for spinning and molding by conventional techniques and make it possible to carry out a smooth and continuous operation. It has also been found that the recovery of these solvents after use is very easily effected, which is most important from the standpoint of practical operation.

Acetonitrile, for example, not only is a good solvent for vinyl formate polymers, such as polyvinyl formate, but the stability in relation to time of a nitrile solution of polyvinyl formate is markedly superior to solutions of polyvinyl formate in acetone or chloroform. For example, when the rise in viscosity was measured in the case of solutions in various solvents of a concentration of 50 g./liter, which were prepared by using polyvinyl formate having a degree of polymerization of about 2500 produced at a polymerization temperature of 30° C., it was found that, whereas the relative viscosity increased by about 35% when allowed to stand at 30° C. for 48 hours in the case of a chloroform or acetone solution, an acetonitrile solution showed an increase of only about 4%, clearly demonstrating the high stability of the nitrile. In practice, in a solution with a high viscosity, such as a spinning solution, this difference will manifest itself even more distinctly. In the case of polyvinyl formate, the greater the degree of polymerization and the lower the polymerization temperature, the greater the tendency to gel, and the more difficult it is to effect solution.

However, even a polyvinyl formate obtained by polymerization at a low polymerization temperature can easily be dissolved by heating when a nitrile such as acetonitrile is used as the solvent, whereby it is possible to prepare a solution of desired concentration with relative ease when the solvents of this invention are employed.

Furthermore, acetonitrile is economical since it is relatively low in price and, because its boiling point is not very high, it has the added advantage that it can readily be used in the dry-spinning method. Not only acetonitrile but other lower alkyl nitriles, e.g. propionitrile, can be used as the solvent in the same manner as acetonitrile, with the same advantages.

The invention will be further understood from the following specific examples of practical application.

However, it will be understood that these examples are not to be construed as limiting the scope of the present invention in any manner. In the examples, all parts are by weight unless otherwise indicated.

Example 1

Twenty-eight parts of polyvinyl formate, having a degree of polymerization of 12,000 and produced by bulk polymerization at a polymerization temperature of 30° C., were added to 78 parts of acetonitrile, and the polymer was dissolved at 80° C. by heating. The solution thus obtained was spun through a metal plate having 20 holes each 0.08 mm. in diameter into a methanol solution of 1 N-caustic soda at a spinning speed of 12 m./min. The polyvinyl alcohol fibers produced were reeled and washed with methanol. After drying, the fibers were subjected to stretching to 5 times their original length. These fibers had a dry strength of about 5 g./denier, and exhibited a high hot-water resistance.

Example 2

Forty parts of polyvinyl formate, having a degree of polymerization of 1360 and obtained by polymerization in methyl formate at a polymerization temperature of 30° C., were added to 78 parts of acetonitrile, and the polymer was dissolved by heating at 60° C. This solution was spun through a metal plate having 100 holes each of 0.08 mm. diameter into a methanol bath at a spinning speed of 10 m./min. After passing the fibers through a methanol bath saturated with caustic soda for 40 seconds, the yarn was reeled and immersed in a solution of 1 N-caustic soda for 20 minutes, whereby polyvinyl alcohol fibers were obtained.

The conditions and relative relationships set forth in the examples are those preferred but it will be understood that other conditions and relationships may be used within the scope of the invention. In general, unless otherwise indicated, conventional operations and techniques are suitably employed. For example, the vinyl formate polymers which are suitably used are those produced by the use of any of the conventional catalysts used in the polymerization and copolymerization of vinyl formate, such as azonitriles or peroxides, but the use of azonitriles is preferred. Thus, conventional vinyl formate polymerization techniques, catalysts, temperatures and polymerization apparatus are employed and suitable polymerization catalysts, vessels and techniques are described, for example, in Hatchard et al. U.S. Patent 2,610,359. The invention is of particular utility in the handling of vinyl formate polymers produced by bulk polymerization techniques, although polymers produced by other techniques, such as solution polymerization can also be used. Polymers produced at low temperatures, e.g. 60° C. or less are particularly suitable. In this connection, reference is made to copending applications Serial No. 43,178, filed July 15, 1960, and now Patent No. 3,134,758, and Serial No. 118,498 filed June 21, 1961, and now abandoned. It will also be understood that the copolymers of vinyl formate which may be used include known copolymers with other ethylenically-unsaturated monomer, such as other vinyl esters, e.g. vinyl acetate and vinyl propionate, and compounds such as ethylene, vinyl chloride and the like. In the foregoing description, the term "lower alkyl" has the conventional meaning of 1 to 5 carbon atoms. Further, while the invention is applicable to solutions of various concentrations including the solutions containing 50 grams per liter described above, it is of particular significance in the case of solutions containing at least 10% by weight of polymer.

In like manner the polyvinyl formate is formed into fibers, films, and other shaped forms by following conventional practice, commonly employed in shaping polyvinyl alcohol and polyvinyl esters. The spinning of a polyvinyl compound to form fibers is described, for example, in the above-mentioned Hatchard et al. U.S. Patent 2,610,359, in Osugi et al. Patent 2,906,594, and in Cottet et al. U.S. Patent 2,936,488. In any case, conventional spinning operations, whether dry-spinning or wet-spinning, can be employed in producing the fibers.

Thus, to form fibers, the polymeric compositions are spun in conventional manner, e.g. by extruding the solution through a shaping zone, e.g. small holes in a spinning jet, into a medium effective to remove water therefrom. In wet-spinning processes the medium can, for example, be a liquid in which the polymer is insoluble, e.g. methanol, while in dry-spinning techniques, air or an inert gas such as nitrogen is employed.

Similarly, films and other shaped forms of polyvinyl formate are suitably produced in conventional manner by the techniques described, for example, in Schnabel U.S. Patent 2,177,612 and in U.S. Patents 2,236,061 and 2,837,770.

It is a feature of the invention that the shaped forms can be first produced by spinning or otherwise shaping the polymer from the solution and these shaped forms can then be converted to polyvinyl alcohol by immersing them in a saponification bath, or the solutions can be directly introduced into a saponification bath so that saponification is effected at least in part in situ in the spinning bath.

With respect to known saponification media and solvents and catalysts which may be employed for producing polyvinyl alcohol from vinyl formate products, reference is suitably made, for example, to Bristol U.S. Patent 2,700,035, Waugh et al. U.S. Patent 2,642,419, Germain U.S. Patent 2,643,994, and to the above-mentioned Cottet et al. U.S. Patent 2,936,488.

The fibers or other shaped products may then suitably be stretched and heat treated in accordance with conventional techniques as illustrated, for example, in U.S. Patents 2,636,803, 2,636,804 and 2,906,594. Thus, the fibers are suitably stretched to a draw ratio of about 2:1 to 12:1 during or after spinning. For wet spun filaments, the stretching can be carried out directly after spinning while the fibers are wet at room temperature up to 100° C. to a draw ratio of about 5:1. For stretching to higher draw ratios, it is preferred to conduct the stretching in a heated medium such as air at 100–250° C.

Heat treatment is usually carried out by heating the fibers in a medium such as air at 210–250° C. for 2 seconds to 5 minutes.

The fibers or other shaped forms of polyvinyl alcohol can also be treated with insolubilizing agents. Thus, for the purpose of insolubilization, not only acetylization by the use of alkyl, aralkyl and aromatic aldehydes such as formaldehyde, acetaldehyde, butylaldehyde, nonylaldehyde, benzaldehyde, monochlorbenzaldehyde, naphthaldehyde, malonaldehyde, glutaldehyde, terphthaldehyde, and the like is suitably effected, but conventional treatments by means of inorganic substances, such as titanization, chroming, and the like can be employed.

Acetalization, for example, is conveniently carried out in conventional manner in an aqueous solution containing 0.2–10% aldehyde, 5–20% sulfuric acid and 0–25% sodium sulfate or ammonium sulfate at temperatures of 40–80° C. for times ranging from a few minutes, e.g. 10 minutes, to several hours, e.g. 5 hours.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:
1. A method of producing shaped polymer forms which comprises, forming a solution of a vinyl formate homopolymer dissolved in a lower alkyl nitrile, said lower alkyl having 1 to 5 carbon atoms, and passing said solution through a shaping zone into a medium effective to separate the homopolymer from the solution in pre-determined form.

2. A method according to claim 1, wherein said lower alkyl nitrile is acetonitrile.

3. A method of producing shaped forms of polyvinyl alcohol which comprises, forming a solution of a vinyl formate homopolymer dissolved in a lower alkyl nitrile, said lower alkyl having 1 to 5 carbon atoms, passing said solution through a shaping zone into a medium to produce a pre-determined shaped form of said vinyl formate homopolymer;

and converting said shaped form to polyvinyl alcohol of substantially the same form.

4. A method according to claim 3, wherein said lower alkyl nitrile is acetonitrile.

5. A method of producing shaped forms of polyvinyl alcohol which comprises, forming a solution of a vinyl formate homopolymer dissolved in a lower alkyl nitrile, said lower alkyl having 1 to 5 carbon atoms, and passing said solution through a shaping zone into a medium effective to form a shaped form of said vinyl formate homopolymer and to convert said polymer shaped form to a polyvinyl alcohol shaped form.

6. A method of producing polyvinyl alcohol fibers which comprises, forming a spinning solution of a vinyl formate homopolymer dissolved in a lower alkyl nitrile, said lower alkyl having 1 to 5 carbon atoms, passing said solution through a spinning zone to form fibers of said vinyl formate homopolymer;

and converting said vinyl formate polymer fibers to polyvinyl alcohol fibers.

7. A method according to claim 6, wherein said lower alkyl nitrile is acetonitrile.

References Cited by the Examiner

UNITED STATES PATENTS

| | | | |
|---|---|---|---|
| 2,427,126 | 9/1947 | Dreyfus. | |
| 2,610,359 | 9/1952 | Hatchard et al. | 260—91.3 |
| 2,874,023 | 2/1959 | Walter | 260—32.4 |
| 2,879,242 | 3/1959 | Weinstock | 260—32.4 |
| 2,936,488 | 5/1960 | Cottet et al. | 260—91.3 |
| 3,111,508 | 11/1963 | Imai et al. | |

FOREIGN PATENTS

| | | |
|---|---|---|
| 866,881 | 5/1961 | Great Britain. |
| 550,450 | 12/1957 | Canada. |

MORRIS LIEBMAN, *Primary Examiner.*

J. W. BEHRINGER, B. A. AMERNICK,
*Assistant Examiners.*